UNITED STATES PATENT OFFICE.

CHARLES S. LOCKWOOD, OF ALBANY, NEW YORK, ASSIGNOR TO THE BONSILATE COMPANY, (LIMITED,) OF SAME PLACE.

PLASTIC MATERIAL.

SPECIFICATION forming part of Letters Patent No. 283,794, dated August 28, 1883.

Application filed September 8, 1882. Renewed June 14, 1883. (No specimens.)

*To all whom it may concern:*

Be it known that I, CHARLES S. LOCKWOOD, of Albany, in the county of Albany and State of New York, have invented a new and useful Improvement in Plastic Materials, of which the following is a specification.

The invention has relation to improvements in plastic materials, and has for its object the production of a composition which may be utilized in the manufacture of articles usually made of ivory and factitious materials.

The invention which is the subject of this application is an improvement upon that described in Letters Patent No. 236,034, granted to John W. Hyatt, J. H. Stevens, and myself, jointly, December 28, 1880. It is based upon the discovery that phosphate of ammonia (or the elements of which it is composed—namely, phosphoric acid and ammonia) may be combined with bone to form a chemical compound, and the compound molded into any desired shape by means of heated dies, employed according to methods which are well understood by persons versed in the art to which the invention relates.

In practicing the invention I make use of a chemically-pure phosphate of ammonia, which will, by preference, be as nearly dehydrated as possible. The second and principal ingredient that I use is bone comminuted and desiccated to form an impalpable powder. In the preparation of the comminuted bone care will be taken to have it as free as possible from foreign matter, which may be accomplished readily by means which are well understood. The ingredients having been prepared, I take about eight pounds of pulverized bone and add to it about two ounces of phosphate of ammonia, mixing the two in any convenient way. The powdered material thus formed is introduced into the molds and completed by pressure. The molds will be of the kind usually employed, and will be heated to a temperature due to a pressure of, say, from sixty to eighty pounds of steam, the pressure being from about one to two tons to the square inch.

The proportions which I have given can be employed with satisfactory results; but it is obvious that they may be varied to some extent without materially affecting the character of the product. The action of the phosphate of ammonia upon the bone being of a chemical nature, any slight departure from the formula of given will not materially prejudice the result.

Instead of using phosphate of ammonia, the elements of which it is composed—namely, phosphoric acid and ammonia—may be used, so as to produce, when combined with the pulverized bone, the same result as they produce when they are brought together to form a phosphate before they are introduced.

The composition formed as hereinbefore described is to be regarded as in the nature of a base, to which an appropriate water-repellent or suitable pigments or other agents may be added, according to the character of the article it is desired to produce. I do not therefore limit myself to an article in which the elements which have been mentioned as of the essence of the invention are used alone. Neither do I limit myself to the exact proportions which I have described, nor to the particular method described, as a like result may be produced by manipulating the elements in connection with a solvent or otherwise; but

What I claim as new, and desire to secure by Letters Patent, is—

1. A composition consisting, essentially, of phosphate of ammonia, or its elements, and comminuted bone, in about the proportions specified.

2. An article formed by pressing a compound consisting of phosphate of ammonia, or its elements, and comminuted bone, in about the proportions set forth, in heated molds, as hereinbefore described.

In testimony that I claim the foregoing improvement in plastic materials, as above described, I have hereunto set my hand this 26th day of June, 1882.

CHARLES S. LOCKWOOD.

Witnesses:
ROBERT C. PRUYN,
CHAS. M. HYATT.